United States Patent
Tuyls et al.

(10) Patent No.: US 10,050,785 B2
(45) Date of Patent: Aug. 14, 2018

(54) SECURE THRESHOLD DECRYPTION PROTOCOL COMPUTATION

(71) Applicant: KONINKLIJKE PHILIPS N.V., Eindhoven (NL)

(72) Inventors: Pim Theo Tuyls, Mol (BE); Berry Schoenmakers, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/715,666

(22) Filed: May 19, 2015

(65) Prior Publication Data
US 2015/0288519 A1 Oct. 8, 2015

Related U.S. Application Data

(63) Continuation of application No. 12/096,802, filed as application No. PCT/IB2006/054646 on Dec. 7, 2006, now Pat. No. 9,077,509.

(30) Foreign Application Priority Data

Dec. 13, 2005 (EP) .................................... 05112048

(51) Int. Cl.
*H04L 9/32* (2006.01)
*H04L 9/08* (2006.01)
(Continued)

(52) U.S. Cl.
CPC ............ *H04L 9/0869* (2013.01); *G06F 7/588* (2013.01); *H04L 9/008* (2013.01); *H04L 9/3231* (2013.01);
(Continued)

(58) Field of Classification Search
CPC ...... H04L 9/0869; H04L 9/0861; H04L 9/008
See application file for complete search history.

(56) References Cited

U.S. PATENT DOCUMENTS 5,619,575 A 4/1997 Koopman et al.
6,035,041 A * 3/2000 Frankel ................... H04L 9/302
380/28

(Continued)

*Primary Examiner* — Esther B Henderson

(57) ABSTRACT

The present invention relates to a method of converting an encrypted data set into an encryption of individual bits representing the data set. Further, the invention relates to a system for converting an encrypted data set into an encryption of individual bits representing the data set. A basic idea of the present invention is to provide a protocol in which it is possible to divide an encryption of a data set in the form of e.g. a biometric feature, such as a number x, where $x \in \{0, 1, \ldots, n-1\}$, into an encryption of respective bits $x_0, x_1, \ldots, x_{t-1}$ forming the number x, where t is the number of bits of the number n−1, without leaking any information about x or its bits $x_0, x_1, \ldots, x_{t-1}$. Hence, the present invention enables splitting of the encryption [[x]] into the respective encrypted bits $[[x_0]], [[x_1]] \ldots, [[x_{t-1}]]$ forming the encrypted number $x = \Sigma_{i=1}^{n} x_i \, 2^i$.

30 Claims, 2 Drawing Sheets

Figure 1:
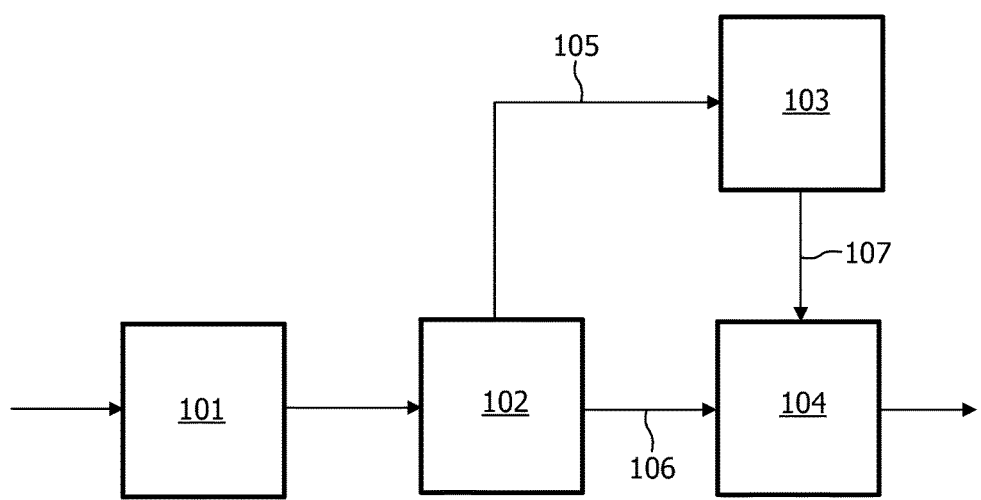

(51) Int. Cl.
*H04L 9/00* (2006.01)
*G06F 7/58* (2006.01)

(52) U.S. Cl.
CPC ...... *H04L 2209/24* (2013.01); *H04L 2209/46* (2013.01); *H04L 2209/805* (2013.01)

(56) References Cited

U.S. PATENT DOCUMENTS

| | | |
|---|---|---|
| 6,862,354 B1 | 3/2005 | McGrew et al. |
| 2003/0012372 A1 | 1/2003 | Cheng |
| 2005/0242923 A1 | 11/2005 | Pearson et al. |

\* cited by examiner

SECURE THRESHOLD DECRYPTION PROTOCOL COMPUTATION

This application claims, pursuant to 35 USC 120, as a Continuation, priority to and the benefit of, the earlier filing date of that patent application entitled "Secure Threshold Decryption Protocol Computation," filed on Jun. 10, 2008 and afforded Ser. No. 12/096,802, which claimed priority to, as a National Stage Filing, that patent application afforded serial number PCT/IB06/54646, filed on Dec. 7, 2006, which claimed priority to patent application filed on Dec. 13, 2005 and afforded serial number EP 05112048.3, the contents of all of which are incorporated by reference herein.

The present invention relates to a method of converting an encrypted data set into an encryption of individual bits representing the data set. Further, the invention relates to a system for converting an encrypted data set into an encryption of individual bits representing the data set.

In secure multiparty computation schemes, a group of participants, also referred to as players, which do not necessarily trust each other, wish to compute a common function by using private data as input to the function, without revealing the private data, while ensuring that the output of the function is correctly computed. For instance, in the well-known Millionaire's protocol, two millionaires want to know who is the richer of the two without revealing any information about their wealth. The two millionaires provide a public function with private data (i.e. the wealth of the respective millionaire), and the function outputs a variable which indicates which one of the two is the richest, without revealing anything else about the private data.

Techniques employed in secure multiparty computation schemes are very well suited to perform privacy preserving operations among a group of players. These techniques may, for example, be implemented in such technical fields as secure auctions, secure profile matching, secure electronic voting and secure biometric authentication. Efficient algorithms for secure multiparty computation based on homomorphic threshold crypto systems are described in "Practical Two-Party Computation based on the Conditional Gate" by B. Schoenmakers and P. Tuyls, Asiacrypt 2004, pages 119-126, LNCS Springer-Verlag 2004.

Authentication of physical objects may be used in many applications, such as conditional access to secure buildings or conditional access to digital data (e.g. stored in a computer or removable storage media), or for identification purposes (e.g. for charging an identified individual for a particular activity, or even for entering a country). The use of biometrics for identification and/or authentication, wherein features that are unique to a user such as fingerprints, irises, ears, faces, etc. are used, is to an ever increasing extent considered to be a better alternative to traditional identification means such as passwords and pin-codes, and "manual" identification involving visual comparison between an individual and, for example, a photo.

A problem to be solved in the prior art is how to divide encryption of a data set in the form of, for example, a biometric feature, such as a number x, where $x \in \{0, 1, \ldots, n-1\}$, into individual encryptions of bits $x_0$, $x_1, \ldots, x_{t-1}$ forming the number x, where t is the number of bits of the number n−1, without leaking any information about x or its bits $x_0, x_1, \ldots, x_{t-1}$. The applications of such an algorithm are numerous, e.g. secure joint primality tests, secure exponentiation, reduction of computational and communication load of a biometric sensor, reduction of the computational load in voting protocols, etc. A protocol for dividing an encrypted number [[x]] into encrypted bits $[[x_0]], [[x_1]], \ldots, [[x_{t-1}]]$ is referred to as a bit splitting protocol.

In "How to Split a Shared Secret into Shared Bits in Constant-Round", by I. Damgaard et al, University of Aarhus, 23 Jun. 2005, a similar problem is treated. However, an unconditionally secure setting is employed. In this disclosure, it is assumed that the players involved in secure multiparty computations described therein have access to a share of a binary data set for which a bit representation is to be securely determined. As a result, a player ends up with shares of the bits forming the binary data set and has to involve the other players to accomplish a complete binary data set.

An object of the present invention is to solve above mentioned problems and provide a method/device for performing secure bit splitting; i.e. converting an encrypted number [[x]] into encryptions of bits $[[x_0]], [[x_1]], \ldots, [[x_{t-1}]]$ forming the number by using properties of homomorphic cryptography.

This object is attained by a method of converting an encrypted data set into an encryption of individual bits representing the data set, and a system for converting an encrypted data set into an encryption of individual bits representing the data set i.

According to a first aspect of the present invention, there is provided a method comprising the steps of generating a random number and computing a bitwise encryption of the random number, securely computing an encrypted sum based on the encrypted data set and the encrypted random number, performing a decryption of the encrypted sum and determining a bit representation of the sum and creating the encryption of the individual bits representing the encrypted data set by processing the sum with the encrypted random number.

According to a second aspect of the present invention, there is provided a system comprising at least a first and a second computing device being arranged to jointly generate a random number and compute a bitwise encryption of the random number. At least one of the computing devices is arranged to compute an encrypted sum based on the encrypted data set and the encrypted random number and the first and second computing device are arranged to jointly perform decryption of the encrypted sum and determine a bit representation of the sum. Further, the first and second computing device are arranged to jointly create the encryption of the individual bits representing the encrypted data set by processing the sum with the encrypted random number.

A basic idea of the present invention is to provide a protocol in which it is possible to divide an encryption of a data set in the form of, for example, a biometric feature, such as a number x, where $x \in \{0, 1, \ldots, n-1\}$, into an encryption of respective bits $x_0, x_1, \ldots, x_{t-1}$ forming the number x, where t is the number of bits of the number n−1, without leaking any information about x or its bits $x_0, x_1, \ldots, x_{t-1}$. Hence, the present invention enables splitting of the encryption [[x]] into the respective encrypted bits $[[x_0]], [[x_1]], \ldots, [[x_{t-1}]]$ forming the encrypted number $x = \sum_{i=1}^{n} x_i 2^i$.

This is advantageous since it allows, for example, in biometric authentication, a single initial encryption of a bit string expressed as a number $x = \sum x_i 2^i$. Then, verification server(s) run a bit splitting protocol to obtain encryptions of the bits forming the number. The string of encrypted bits may subsequently be compared to encrypted biometric features attained during enrollment, such that a check for correspondence can be made to authenticate a user. The actual comparison of encrypted biometric data is typically performed by engaging a biometric sensor and a verifying device in a two-party (or multi-party) protocol in which two sets of encrypted biometric data are compared to each other to see if there is (sufficient) correspondence between the two sets, using, for example, Hamming distances.

The participants in the protocol are referred to as players. The players jointly generate a random number and perform bitwise encryption of this random number. Preferably, the encryptions of the random number are accompanied by publicly verifiable proofs which are arranged to show that the random number has been correctly decrypted. A sum based on the encrypted random number and the encrypted data set is encrypted using a homomorphic encryption scheme. The term "homomorphic" implies that [[x+y]]=[[x]][[y]], i.e. the encryption of (x+y) is equal to the encryption of x multiplied with the encryption of y.

After the encrypted sum has been computed, the players perform a threshold decryption protocol and attain a clear text copy of the sum, which has the characteristics of a random number, for which a bit representation is determined. The players then jointly subtract the encrypted bits of the random number from a clear text copy of the sum using the bit representation. This operation creates a bit representation $[[x_0]], \ldots, [[x_{t-1}]]$ of the data set [[x]].

The present invention is advantageous, since the encryptions $[[x_0]], [[x_1]], \ldots, [[x_{t-1}]]$ are available to all the players, who can use those for subsequent computations without having to involve the other players. The present invention solves this problem in a cryptographic setting instead of in an unconditional setting. Further, the present invention enables reduction of the computational and communication load of, for example, a biometric sensor, assuming that the data set that is encrypted is extracted from a biometric feature of an individual.

Further features of, and advantages with, the present invention will become apparent when studying the appended claims and the following description. Those skilled in the art realize that different features of the present invention can be combined to create embodiments other than those described in the following.

Figure 2:
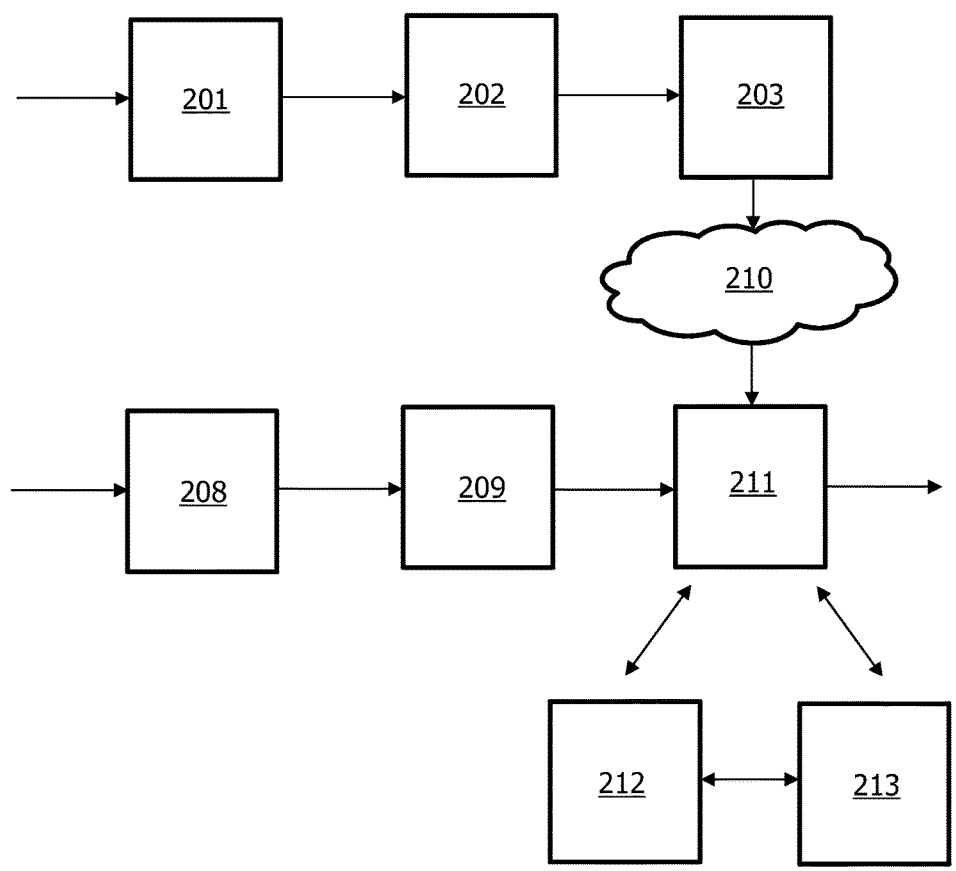

Preferred embodiments of the present invention will be described in detail with reference made to the attached drawings, in which:

FIG. 1 shows a basic prior art system for identification and authentication of an individual based on biometric data associated with the individual, in which the present invention advantageously may be applied; and FIG. 2 shows another system for identification and authentication of an individual based on biometric data associated with the individual, in which the present invention advantageously may be applied.

In order to perform the secure multiparty computations described in this application, a homomorphic threshold encryption system, such as e.g. Paillier or El Gamal, is used. The term "homomorphic" implies that [[x+y]]=[[x]][[y]], i.e. the encryption of (x+y) is equal to the encryption of x multiplied with the encryption of y. The term further implies that $[[x]]^a=[[x*a]]$ for any x and a. The term "threshold" implies that each player among a group of one players has access to a share of a secret key such that any group of t or more players together can decrypt a cipher text but any smaller group cannot decrypt the cipher text.

The present invention may advantageously be employed in a biometric authentication system, in which biometric features of a user are compared to reference data. If a match occurs, the user is identified and can be granted access. The reference data for the user has been obtained earlier and is stored securely, for example, in a secure database or smart card. The physical object to be authenticated may also be non-human. For example, the object may be a storage medium like a CD, a DVD or a solid-state memory containing protected digital content. In that case, biometrics is not necessarily used, but in an analog manner, some identifying feature (in the form of, for example, . a bit sequence) that should be kept secret is provided and compared to the corresponding reference data.

In authentication, the user claims to have a certain identity and an offered biometric template is compared with a stored biometric template that is linked to the claimed identity, in order to verify correspondence between the offered and the stored template. In identification, the offered biometric template is compared with all stored available templates, in order to verify correspondence between the offered and stored template. It should be noted that biometric data is a good representation of the identity of an individual, and unauthenticated acquirement of biometric data associated with an individual can be seen as an electronic equivalent of stealing the individual's identity. After having acquired appropriate biometric data identifying an individual, the hacker may impersonate the individual whose identity the hacker acquired. Moreover, biometric data may contain sensitive and private information on health conditions. Hence, the integrity of individuals employing biometric authentication/identification systems must be safeguarded.

In a homomorphic crypto system, public key encryption is employed and two (or more) players, e.g. a user and a verifier (or a number of verifiers), have access to the same public key. Further, the user and the verifier each have access to a share of a corresponding private key. The shares of the private key are used for decryption.

The user may carry her share with her (e.g. on a smart card) or the share may be stored in a sensor of e.g. a biometric identification system with which the user interacts. During enrollment, a sequence of bits $x_0, x_1, \ldots, x_{t-1}$ representing a biometric identifier is captured, and converted into a number x.

$$x = \sum_{i=0}^{t-1} x_i 2^i,$$

and encrypted with the common public key. The encryption [[x]] of the number x is then passed on to the verifier, which stores it. Note that the verifier cannot decrypt the encrypted number, as the verifier only has access to his share of the private key, and not to the share of the user. Hence, the plaintext representation x of the biometric identifier remains hidden for the verifier. Note that the verifier preferably consists of several servers that jointly and securely perform matching computations. Each of the servers has a share of the secret key. Only if a sufficient number of servers collaborate, decryption can be performed.

During authentication, a noisy representation y of the biometric identifier is obtained at a sensor of the system. Note that this sensor not necessarily is the same as the sensor with which enrolment was performed, and is typically a low-cost sensor having limited computing resources. Typically, the authentication sensor is remote from the enrollment sensor. For example, the enrollment—which is performed only once—may be made at an enrollment authority in the form of any DVD/video store comprised in a greater chain of stores, while authentication typically is performed at a specific store at which the user rents a DVD. This store may be viewed upon as the actual verifier, at which the user is to be authenticated. The process of authenticating the user is performed every time she rents a DVD at the store. This authenticating sensor encrypts y with the common public key. Subsequently, secure verification servers convert the encrypted number [[y]] into encryptions of the respective bit [[$y_0$]], . . . , [[$y_{t-1}$]] forming the number y. Then, the encrypted bit representations [[$x_0$]], . . . , [[$x_{t-1}$]] and [[$y_0$]], . . . , [[$y_{t-1}$]] are compared to each other in a secure way. Hence, a check for correspondence is made, such that the user can be authenticated.

In an embodiment of the invention, it is assumed that a number x is to be encrypted, where $x \in \{0, 1, \ldots, n-1\}$. The input of the protocol employed for encryption is given by the encryption [[x]] and the output by [[$x_0$]], . . . , [[$x_{t-1}$]] where t denotes bit-length of the number n−1. The participants in the protocol are referred to as players.

First, the players, which typically are embodied in the form of a group of secure servers, jointly generate a random number $0 \le r < n$ and perform bitwise encryption [[$r_0$]], . . . , [[$r_{t-1}$]] of the random number, where $$r = \sum_{i=0}^{t-1} r_i 2^i.$$

Hence, assuming that r=9, then $r_0$=1, $r_1$=0, $r_2$=0 and $r_3$=1. As a consequence, $r=1*2^0+0*2^1+0*2^2+1*2^3=1+0+0+8=9$. In case two secure servers are employed, the two servers jointly generate and encrypt random bits. For example, for $r_0$, the first server computes [[$r_0'$]] and the second server computes [[$r_0''$]]. Then, [[$r_0$]]=[[$r_0' \oplus r_0''$]] is computed securely, where $\oplus$ denotes an XOR operation. This procedure is followed for all the bits [[$r_0$]], . . . , [[$r_{t-1}$]] of the random number.

The encryptions are accompanied by necessary zero-knowledge proofs, which are arranged to show that encrypted bits are correct. A number of different techniques of computing such proofs exist. In an El Gamal setting, proofs may be computed as follows. Given a private key $\alpha=\log_g h$, decryption is performed by calculating $b/a^\alpha$, which is equal to $g^m$ for some message $m \in Z_q$. Encryptions are computed by means of a common public key h while decryptions are done using a joint protocol between parties, each player possessing a share of the private key $\alpha=\log_g h$. The players obtain their share by running a distributed key generation protocol.

Distributed key generation is achieved by having players $P_1$, $P_2$ (e.g., a biometric sensor and a verifier, or the first and second server) first broadcast commitments $c_i=g^{\alpha_i}h^{r_i}$, with $\alpha_i$, $r_i \in Z_q$ for i=1, 2, and then broadcast the values $r_i$ along with proofs of knowledge of $\log_g h_i$, where $h_i=c_i/h^{r_i}$ for i=1, 2. The joint public key is $h=h_1 h_2$, with private key $\alpha=\alpha_1+\alpha_2$. To decrypt an encryption (a, b), player $P_i$ produces $d_i=a^{\alpha_i}$, along with a proof that $\log_a d_i=\log_g h_i$, i.e., a proof being arranged to show that the encrypted output data is correct without revealing information about the plaintext copies of the data which is encrypted. The message is then recovered from $b/(a_1 a_2)$. Note that for a Paillier system, the procedure is different.

After the players have generated encrypted bits [[$r_0$]], . . . , [[$r_{t-1}$]], they compute the encryption [[x+r]] as $$[[x]]\prod_{i=0}^{t-1}[[r_i]]^{2^i}.$$

This is done by using a general secure multiplication or a restricted multiplication gate referred to as a conditional gate. Using a conditional gate, two encrypted values r and x may efficiently be multiplied, as long as r is restricted to a two-valued domain, e.g., $r \in \{0, 1\}$. There is no restriction on the value of x, e.g., $x \in Z_n*$. The encryption [[x+r]] is not necessarily computed by all players, but may be computed by one single player, e.g. the first secure server, and distributed to the other players, i.e., the second secure server.

Then, the players jointly perform a threshold decryption protocol and compute y=(x+r) mod n in the clear. Because of the data forming the number y, y also has the characteristics of a random number, and the plain text representations x, r cannot be derived from y, since neither x nor r are public data. The players determine the bit-representation of y and jointly subtract the encryption [[r]] of the generated random number r from this bit-representation. This is accomplished by bitwise subtraction, i.e. $y_0$−[[$r_0$]], $y_1$−[[$r_1$]], . . . , $y_{t-1}$−[[$r_{t-1}$]]. This results in another encryption [[z]], which is computed as

[[z]]=y−[[r]], by using a secure subtraction circuit (on encrypted bits).

This results in the bit representation of a number z=x or z=x−n given by the encrypted bits [[$z_0$]], . . . , [[$z_{t-1}$]] where $z_t$ is a sign bit. Thus, depending on the sign bit, either [[$x_0$]], . . . , [[$x_{t-1}$]] or [[$(x-n)_0$]], . . . , [[$(x-n)_{t-1}$]] is acquired. The players reduce the value of z modulo n by adding $nz_t$ to z using the bit representations. Hence, bit-representations [[$x_0$]], . . . , [[$x_{t-1}$]] are created.

In another embodiment of the invention, it is assumed that $0 \le x < 2^m << 2^k < n$, $k >> m$ and hence $2^k >> 2^m$. The input of the protocol employed for encryption is again given by the encryption [[x]] and the output by [[$x_0$]], . . . , [[$x_{t-1}$]]. In this exemplifying embodiment, it is described how the least m significant bits $x_0, \ldots x_{m-1}$ of x are determined. Each player $P_i$, $1 \le i \le l$, chooses random bits $r_{0,i}, \ldots, r_{m-1,i}$, where $r_{*,i} \in_R \{0,1\}$ and $r'_i \in \{0, \ldots, 2^{k-m}-1\}$, encrypts these bits and distributes the encryptions [[$r_{0,i}$]], . . . , [[$r_{m-1,i}$]] and [[$r'_i$]] together with proofs that the encryptions have been computed correctly.

The players use these encrypted bits to jointly create encryptions of random bits [[$r_0$]], . . . , [[$r_{m-1}$]] where the encryption of the random bit r is securely calculated as $$r = \sum_{i=1}^{l} r_{j,i} \bmod 2$$

using secure multiplication gates and a random number r' which is calculated as $$r' = \sum_{i=1}^{l} r'_i$$

using homomorphic cryptographic properties.

The players jointly form the encryption [[x−r]], and the encryption [[x−r]] is then jointly decrypted using a threshold decryption protocol to reveal the value y=x−r, where $$r = \sum_{j=0}^{m-l} r_j * 2^j + r' 2^m < 2^k.$$

The public bits $y_0, \ldots, y_{m-1}$ denote the binary representation of y mod $2^m$. A secure addition circuit for public inputs $y_0, \ldots, y_{m-1}$ and $[[r_0]], \ldots, [[r_{m-1}]]$ is used to produce an output of m encrypted bits $[[x_0]], \ldots, [[x_{m-1}]]$. By computing y mod $2^m$, a final carry bit is ignored.

FIG. 1 shows a basic prior art system for identification and authentication of an individual based on biometric data associated with the individual, in which system the present invention advantageously may be employed. An individual's raw biometric data, e.g. fingerprints, iris or retinal, facial or hand geometry, voice features etc., is acquired at a sensor 101. Typically, a sequence of bits $x_0, x_1, \ldots, x_{t-1}$ representing the biometric data is acquired at the sensor. The acquired data (i.e. raw, plaintext data) is typically processed at a processing device 102 such as a digital signal processor (DSP). The processing device may be integrated with the sensor. This processing involves conversion of the bits into a number x, which is encrypted with the common public key. The encryption $[[x]]$ of the number x is then stored (or the encryptions of the bits of x) via path 105 in a database storage 103 of a service provider. This is an initialization procedure which is performed once for each individual that wishes to access the particular system, in order to register the individual.

Subsequently, when the individual wishes to access the service, she provides plaintext biometric data $y_0, \ldots, y_{t-1}$ to the sensor 101. This data is then, after encryption, via path 106 compared to the biometric data $[[x]]$ of the individual which previously was stored in the database. If there is a match in the comparison performed at a comparing device 104 between the sets of data provided via path 106 and 107, the individual is given access to the service that is provided. When performing the comparison, the bit splitting protocol described in the above is undertaken for the encrypted data $[[x]]$ stored at the storage 103, such that a bitwise comparison between $[[y_0]], \ldots, [[y_{t-1}]]$ and $[[x_0]], \ldots, [[x_{t-1}]]$ can be made.

Hence, with reference to FIG. 1, the sensor 101 may in an initial feature-extracting session act as an enroller, whereas in a subsequent session, the sensor 101 acts as a verifier that checks for correspondence, in the comparing device 104, between subsequently provided biometric information y (via path 106) and initially enrolled biometric information x (via path 107). As previously mentioned, the devices of FIG. 1 may be located remotely from each other. In the type of system shown in FIG. 1, the sensor 101 is typically relatively powerful for computing cryptographic operations. In case a powerful sensor is employed, the sensor 101/processing device 102 and the comparing device 104 jointly perform the bit splitting protocol of the present invention.

FIG. 2 shows another system for identification and authentication of an individual based on biometric data associated with the individual, in which the present invention may be applied. Here, the enrolling sensor 201 and the verifying, or authenticating, sensor 208 is located remote from each other. As in FIG. 1, the acquired data (i.e. raw, plaintext data) $x_0, x_1, \ldots, x_{t-1}$ is converted into a number x and encrypted with the common public key at a DSP 202. The encryption $[[x]]$ of the number x is then stored in a database storage 203. Subsequently, when the individual wishes to access the system, she provides plaintext biometric data $y_0, \ldots, y_{t-1}$ to the authenticating sensor 208. This data is then converted into a number y and encrypted by DSP 209. Hence, with reference made to FIG. 2, where it is assumed that a biometric template x previously has been provided to the enrolling sensor 201, encrypted at the DSP 202 and stored in encrypted form $[[x]]$ in the database storage 203, when an individual requires access to the system, her biometric template y (which is a noisy representation of x) is extracted by the verifying sensor 208 (also referred to as the authenticating sensor) and encrypted by the DSP 209 to create an encrypted copy $[[y]]$. Typically, the DSP 209 is included in the authenticating sensor 208. In this particular system, the present invention is even more advantageous than in the system shown in FIG. 1, since the sensor 208 typically is a low-cost sensor having limited computing resources.

The number $[[x]]$ is passed on to the verifier 211, possibly via a network 210 such as the Internet, which stores the string. The verifier 211 also typically contains a DSP, even though it is not shown in FIG. 2. Note that the verifier cannot decrypt $[[x]]$, as the verifier only has access to its share of the private key, and not to the share of the individual. Hence, the plaintext representation x of the biometric identifier remains hidden for the verifier 211. A secure bit splitting protocol according to the present invention will be run at the verifier 211. To improve security, execution of the bit splitting protocol is outsourced to a group of secure servers 212, 213. The verifier 211 thus provides the servers with the encryption $[[x]]$ and $[[y]]$ of each set of biometric data x and y, respectively.

As previously have been described, the secure servers 212, 213 jointly generate a random number $0 \leq r < n$ and perform bitwise encryption $[[r_0]], \ldots, [[r_{t-1}]]$ of the random number. The encryptions of the random number are accompanied by necessary zero-knowledge proofs, which are arranged to show that encrypted bits are correct. When the servers 212, 213 have generated encrypted bits $[[r_0]], \ldots, [[r_{t-1}]]$, they (or at least one of the two servers) compute the encryption $[[x+r]]$ as $$[[x]] \prod_{i=0}^{t-1} [[r_i]]^{2^i}.$$

Then, the servers 212, 213 jointly perform a threshold decryption protocol and compute $y=(x+r)$ mod n in the clear, and determine the bit-representation of y and jointly subtract the encryption $[[r]]$ of the generated random number r from this bit-representation. Consequently another encryption $[[z]]$ is created, which is computed as $$[[z]] = y - [[r]].$$

This results in the bit representation of a number $z=x$ or $z=x-n$ given by the encrypted bits $[[z_0]], \ldots, [[z_{t-1}]]$ where $z_t$ is a sign bit. Thus, depending on the sign bit, either $[[x_0]], \ldots, [[x_{t-1}]]$ or $[[(x-n)_0]], \ldots, [[(x-n)_{t-1}]]$ is acquired. One of the servers 212, 213 (or both) reduce the value of z modulo n by adding $nz_t$ to z using the bit representations. Hence, bit-representations $[[x_0]], \ldots, [[x_{t-1}]]$ are created. The bit-representations $[[y_0]], \ldots, [[y_{t-1}]]$ are created in an analog manner.

Now, when the bit splitting protocol has been performed, the verifier 211 and the authenticating sensor 208 may use any known appropriate method of comparing the encrypted biometric data, for instance the method disclosed in ID695459/NL041335, to find out whether there is correspondence between the encrypted bit representations $[[y_0]], \ldots, [[y_{t-1}]]$ and $[[x_0]], \ldots, [[x_{t-1}]]$.

Even though the invention has been described with reference to specific exemplifying embodiments thereof, many different alterations, modifications and the like will become apparent for those skilled in the art. The described embodiments are therefore not intended to limit the scope of the invention, as defined by the appended claims. It should be noted that even though two secure servers jointly perform the bit splitting protocol according to the exemplifying embodiments of the invention shown in the above, any appropriate number of secure servers may be employed to jointly perform the bit splitting protocol.

What is claimed is:

1. A validation apparatus configured to validate an identity, the validation apparatus comprising:
   an enroller, comprising a digital signal processor (DSP), configured to receive a first number and generate an encrypted version of the first number; and
   a validator, comprising a digital signal processor (DSP), configured to receive a second number and generate an encrypted version of the second number;
   a verifier apparatus comprising:
      at least two servers, each of said servers comprising at least a digital signal processor (DSP), each of said at least two servers configured to:
         receive the encrypted first number and second number; and
         jointly:
            generate a random number;
            decompose the random number into a bit representation; and
            encrypt each of the bits of the bit representation of the random number, wherein
         at least one of the at least two servers configured to determine:
            an encrypted representation of the first number as a sum of the encrypted first number and the encrypted bit representation of the random number; and
            an encrypted representation of the second number as a sum of the encrypted second and the encrypted bit representation of the random number;
         the at least two server apparatus configured to jointly:
            generate an encrypted bit representation of the first number by:
               decrypting the encrypted representation of the first number; and
               subtracting the encrypted random number; and
            generate an encrypted bit representation of the second number by:
               decrypting the encrypted representation of the second number; and
               subtracting the encrypted random number;
            compare the encrypted bit representation of the first number and the encrypted bit representation of the second number; and
            validate the identity when the comparison of the encrypted bit representations is within a predetermined distance.

2. The validation apparatus of claim 1, wherein decrypting the encrypted representation of the first number and decrypting the encrypted representation of the second number comprises creating an encryption representation of each of a plurality of bits representing the first number and each of a plurality of bits representing the second number.

3. The validation apparatus of claim 1, wherein the comparison is performed on a bitwise basis.

4. The validation apparatus of claim 1, the enroller comprises:
   a first sensor apparatus having computing capability, configured to receive a feature; and
   a first processor validation apparatus configured to:
      obtain a bit representation of the feature obtained by the first sensor; and
      generate the first number from the bit representation.

5. The validation apparatus of claim 1, comprising:
   a second sensor apparatus having computing capability, configured to measure a feature; and
   a second processor apparatus configured to:
      obtain a bit representation of the feature obtained by the second sensor apparatus; and
      generate the second number from the bit representation.

6. The validation apparatus of claim 4, wherein the feature is one of: a biometric feature and a unique feature.

7. The validation apparatus of claim 1, wherein the distance is a Hamming distance.

8. The validation apparatus of claim 1, wherein the encryption of the first number and the second number is performed using a public key and each of the at least two server apparatus contains a portion of a private key associated with the public key.

9. A validation apparatus configured to validate an identity, the validation apparatus comprising:
   an authenticator, comprising a processor and memory, configured to:
      receive a representation of a feature; and
      encrypt the representation of the feature;
   a verifier comprising a plurality of server apparatus, each of the server apparatus comprising a processor, configured to:
      receive the encrypted representation of the feature;
      jointly generate a random value and an encrypted version of the random value;
      encrypt the received representation of the feature as a sum of the encrypted representation of the feature and the jointly encrypted version of the random value,
   wherein the encrypting as a sum is performed by at least one server apparatus, of the plurality of server apparatus, configured to:
      jointly with another of the plurality of server apparatus, decrypt the encrypted sum and determine a bit representation of the decrypted encrypted sum:
      jointly with another of the plurality of server apparatus, create an encryption of the bit representation of the decrypted encrypted sum;
      compare the encrypted bit representation of the decrypted encrypted sum with an encrypted bit representation of a first value; and
   validate the identity based on the comparison being within a desired distance measure.

10. The validation apparatus of claim 9, the verifier comprising a storage unit configured to store the encrypted bit representation of the first value.

11. The validation apparatus of claim 9, the verifier is configured to determine the encrypted bit representation of the first value.

12. The validation apparatus of claim 11, wherein the encrypted bit representation of the first value is determined by:
   encrypting a received representation of the first value as a sum of an encrypted version of the first value and the jointly encrypted version of the random value;
   jointly decrypting the encrypted sum and determining a bit representation of the decrypted encrypted sum of the encrypted first value and the jointly encrypted version of the random value; and jointly creating an encryption of the bit representation of the decrypted encrypted sum of the encrypted first number and the jointly encrypted version of the random value.

13. The validation apparatus of claim 9, wherein the first value represents a biometric feature.

14. The validation apparatus of claim 9 comprising an enroller comprising:
a sensor apparatus having computing resources, configured to obtain a bitwise representation of the feature; and
a processor apparatus configured to:
generate the first value based on the bitwise representation of the feature;
encrypt the first value; and
provide the encrypted first value to the verifier.

15. The validation apparatus of claim 14, the processor apparatus configured to:
encrypt the bitwise representation of the feature; and
provide the encrypted bitwise representation of the feature to the verifier.

16. A validation apparatus configured to validate an identity, the validation apparatus comprising:
an enrollment server apparatus, comprising a processor and memory, configured to generate and encrypt, with a public key, a first representation of a feature;
an authentication server apparatus, comprising a processor, generating configured to generate and encrypt, with the public key, a second representation of the feature;
a plurality of verification server apparatus, each of the verification server apparatus comprising a processor, and having a portion of a private key associated with the public key, the verification server apparatus configured to:
receive the encrypted first representation and the encrypted second representation of the feature;
jointly generate a random value and an encrypted representation of the random value;
at least one of the plurality of verification server apparatus encrypting the encrypted first representation and the encrypted random value as a first encrypted sum and encrypting the encrypted second representation and the encrypted random value as a second sum;
jointly decrypt each of the encrypted first sum and the second sum;
determine a distance between the decrypted first sum and the decrypted second sum; and
validate the identity based on the determined distance.

17. The validation apparatus of claim 16, wherein the encypted represenation of the random value is a bitwise representation.

18. The validation apparatus of claims 16, wherein the enrollment service server apparatus and the authentication server, each comprise:
a sensor apparatus configured to obtain a bitwise representation of the feature; and
a processor apparatus configured to:
generate the representation of the feature based on the bitwise representation to the feature;
encrypt the generated representation of the feature; and
provide the encrypted representation to at least one of the plurality of verification servers.

19. The validation apparatus of claim 16, wherein the distance is based on a bitwise comparison of the decrypted encrypted first sum and the decrypted second sum.

20. The validation apparatus of claim 16, wherein the distance is a Hamming distance.

21. The validation apparatus of claim 16, wherein the feature is one of: a biometric feature associated with a user and a unique feature associated with an object.

22. The validation apparatus of claim 1, wherein encryption of the sum of the first value and the encrypted random value is performed using a homomorphic crypto apparatus.

23. The validation apparatus of claim 1, wherein a number of validation servers corresponds to a bit length of a number to be encrypted.

24. A method of operating validation apparatus configured to validate an identity, the method comprising:
in a validation apparatus:
receiving in a plurality of server apparatus, an encrypted representation of a feature from an authenticating device;
jointly generating in the plurality of server apparatus, a random value and an encrypted version of the random value;
encrypting in at least one of the plurality of server apparatus, the received representation of the feature as a sum of the encrypted representation of the feature and the jointly encrypted version of the random value;
jointly decrypting in the plurality of server apparatus, the encrypted sum and determining a bit representation of the decrypted encrypted sum:
jointly creating in the plurality of server apparatus, an encryption of the bit representation of the decrypted encrypted sum;
comparing in at least one of the plurality of server apparatus, the encrypted bit representation of the decrypted encrypted sum with an encrypted bit representation of a first value; and
validating in at least one of the plurality of server apparatus, the identity based on the comparison being within a desired distance measure.

25. The method of claim 24, the validation apparatus comprising a storage unit storing the encrypted bit representation of the first value.

26. The method of claim 24, wherein the verifier determines the encrypted bit representation of the first value.

27. The method of claim 24, wherein the encrypted bit representation of the first value is determined by:
encrypting in at least one of the plurality of server apparatus, a received representation of the first value as a sum of an encrypted version of the first number and the jointly encrypted version of the random value;
jointly decrypting in the plurality of server apparatus, the encrypted sum and determining a bit representation of the decrypted encrypted sum of the encrypted first value and the jointly encrypted version of the random value; and
jointly creating in the plurality of server apparatus, an encryption of the bit representation of the decrypted encrypted sum of the encrypted first value and the jointly encrypted version of the random value.

28. The method of claim 24, wherein the first value represents a biometric feature.

29. The method of claim 24 comprising:
an enrollment apparatus comprising a sensor apparatus obtaining a bitwise representation of the feature; and a processor apparatus configured to:

generate the first value based on the bitwise representation of the feature;

encrypt the first value; and provide the encrypted first value to the verifier.

30. The method of claim 24, the processor configured to:

encrypt the bitwise representation of the feature; and provide the encrypted bitwise representation of the feature to the verifier.

* * * * *